US011303422B2

(12) United States Patent
Kakishima et al.

(10) Patent No.: US 11,303,422 B2
(45) Date of Patent: Apr. 12, 2022

(54) USER EQUIPMENT THAT TRANSMITS DEMODULATION REFERENCE SIGNALS (DM-RSS)

(71) Applicant: NTT DOCOMO, INC., Tokyo (JP)

(72) Inventors: Yuichi Kakishima, Tokyo (JP); Hideyuki Moroga, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 51 days.

(21) Appl. No.: 16/764,269

(22) PCT Filed: Nov. 19, 2018

(86) PCT No.: PCT/US2018/061783
§ 371 (c)(1),
(2) Date: May 14, 2020

(87) PCT Pub. No.: WO2019/099988
PCT Pub. Date: May 23, 2019

(65) Prior Publication Data
US 2020/0403767 A1 Dec. 24, 2020

Related U.S. Application Data

(60) Provisional application No. 62/587,747, filed on Nov. 17, 2017.

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04L 27/2607* (2013.01);
(Continued)

(58) Field of Classification Search
None
See application file for complete search history.

(56) References Cited

U.S. PATENT DOCUMENTS

2020/0036470 A1* 1/2020 Olesen .................. H04L 1/0025
2020/0267718 A1* 8/2020 Park ..................... H04L 27/2602

OTHER PUBLICATIONS

International Search Report issued in PCT/US2018/061783 dated Feb. 13, 2019 (3 pages).

(Continued)

*Primary Examiner* — Sai Aung
(74) *Attorney, Agent, or Firm* — Osha Bergman Watanabe & Burton LLP

(57) ABSTRACT

A user equipment (UE) includes a transmitter that transmits, to a base station (BS), Demodulation Reference Signals (DM-RSs) using Discrete Fourier Transform (DFT)-spread (s)-Orthogonal Frequency-Division Multiplexing (OFDM). The resource elements (REs) that do not multiplex the DM-RSs in an OFDM symbol are set as Null. The transmission power for transmission of the DM-RSs is different from transmission power for transmission of normal DM-RSs. The normal DM-RS is a DM-RS using a Cyclic Prefix (CP)-OFDM. The UE further includes a processor that determines the transmission power for the DM-RSs based on a reciprocal of frequency multiplexing density of the DM-RSs. The transmission power for the DM-RSs is two times more than the normal DM-RSs when a configuration of the DM-RSs is a DM-RS configuration type 1. The transmission power for the DM-RSs is three times more than the normal DM-RSs when a configuration of the DM-RSs is a DM-RS configuration type 2.

8 Claims, 14 Drawing Sheets

(51) Int. Cl.
  *H04L 27/26* (2006.01)
  *H04W 52/14* (2009.01)
  *H04W 52/32* (2009.01)
  *H04W 88/02* (2009.01)
(52) U.S. Cl.
  CPC ....... *H04L 27/2636* (2013.01); *H04W 52/146* (2013.01); *H04W 52/325* (2013.01); *H04W 88/02* (2013.01)

(56) References Cited

OTHER PUBLICATIONS

Written Opinion of the International Searching Authority issued in PCT/US2018/061783 dated Feb. 13, 2019 (8 pages).
3GPP TS 36.213 V14.4.0; "3rd Generation Partnership Project; Technical Specification Group Radio Access Network; Evolved Universal Terrestrial Radio Access (E-UTRA); Physical layer procedures (Release 14)" Sep. 2017 (462 pages).
3GPP TS 36.211 V14.4.0; "3rd Generation Partnership Project; Technical Specification Group Radio Access Network; Evolved Universal Terrestrial Radio Access (E-UTRA); Physical channels and modulation (Release 14)"; Sep. 2017 (197 pages).
Intel Corporation; "Uplink DM-RS design for NR"; 3GPP TSG RAN WG1 NR Ad hoc meeting, R1-1700353; Spokane, USA; Jan. 16-20, 2017 (3 pages).
Nokia et al.; "On the DL DMRS structure for NR physical data channels"; 3GPP TSG RAN WG1 #88, R1-1703180; Athens, Greece; Feb. 13-17, 2017 (7 pages).
LG Electronics; "On DMRS design"; 3GPP TSG RAN WG1 Meeting NR#3, R1-1715865; Nagoya, Japan; Sep. 18-21, 2017 (16 pages).
ZTE et al.; "WF on multiplexing between DMRS and data"; 3GPP TSG RAN WG1 NR Ad-Hoc#2, R1-1711722; Qingdao, P.R. China; Jun. 27-30, 2017 (3 pages).
Office Action issued in the counterpart European Patent Application No. 18819399.9, dated May 28, 2021 (7 pages).

* cited by examiner

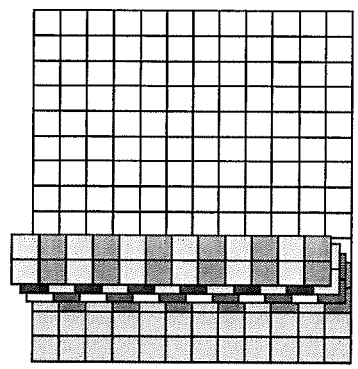
Configuration type 1
FIG. 1A
One OFDM symbol: Comb 2 + 2 CS (Up to 4 ports)
Two OFDM symbols: Comb 2 + 2 CS + TD-OCC (Up to 8 ports)
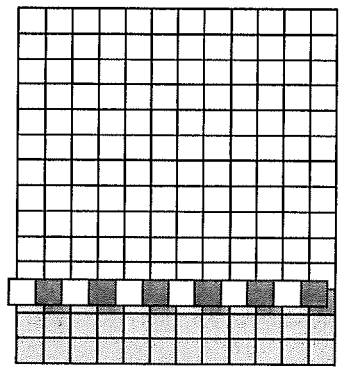
Configuration type 2
FIG. 1B
One OFDM symbol: FD-OCC + adjacent REs (Up to 6 ports)
Two OFDM symbols: FD-OCC + adjacent REs + TD-OCC (Up to 12 ports)
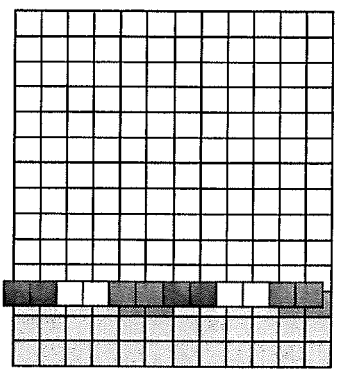
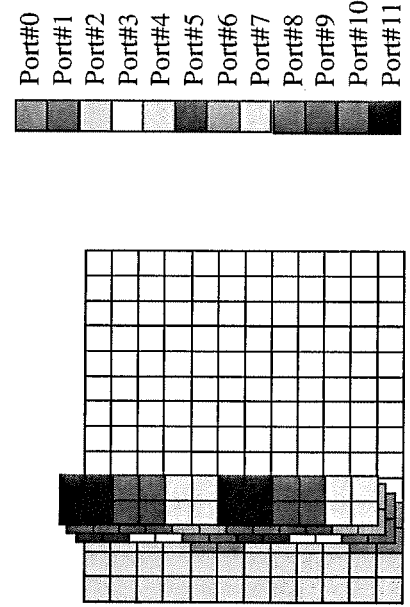

USER EQUIPMENT THAT TRANSMITS DEMODULATION REFERENCE SIGNALS (DM-RSS)

TECHNICAL FIELD

One or more embodiments disclosed herein relate to a user equipment that transmits uplink Demodulation Reference Signal (DM-RS) and a control method of transmission power of the uplink DM-RS.

BACKGROUND

Design for an uplink Demodulation Reference Signal (DM-RS) for New Radio (NR) (fifth generation (5G)) has been studied in the 3rd Generation Partnership Project (3GPP) Working Group (WG). The uplink DM-RS includes a Front-Loaded (FL) DM-RS and an Additional DM-RS which is transmitted after transmitting the FL DM-RS.

The FL DM-RS has a DM-RS configuration type 1 and a DM-RS configuration type 2. FIGS. 1A and 1B show DM-RS configurations of the DM-RS configuration type 1 and the DM-RS configuration type 2, respectively. In FIGS. 1A and 1B, a horizontal axis represents an Orthogonal Frequency-Division Multiplexing (OFDM) symbol axis (time axis) and a vertical axis represents a subcarrier axis (frequency axis).

As shown in FIG. 1A, in the DM-RS configuration type 1, each of ports #0-4 for DM-RS transmission is mapped to resource elements (REs) with alternate REs in the subcarrier axis (comb 2 DM-RS structure) per OFDM symbol.

As shown in FIG. 1B, in the DM-RS configuration type 2, a pair of each of ports #0-5 for DM-RS transmission is mapped to REs with every three pairs of ports per OFDM symbol.

The DM-RS can be applicable for uplink Discrete Fourier Transform (DFT)-spread (s)-OFDM to ensure coverage in addition to Cyclic Prefix (CP)-OFDM. However, a configuration of the DM-RS using the DFT-s-OFDM and a control method of transmission power of the DM-RS using the DFT-s-OFDM have not been determined in the 3GPP WG.

CITATION LIST

Non-Patent Reference

[Non-Patent Reference 1] 3GPP, TS 36.211 V 14.4.0
[Non-Patent Reference 2] 3GPP, TS 36.213 V 14.4.0

SUMMARY

One or more embodiments of the invention relate to a user equipment (UE) that includes a transmitter that transmits, to a base station (BS), Demodulation Reference Signals (DM-RSs) using Discrete Fourier Transform (DFT)-spread (s)-Orthogonal Frequency-Division Multiplexing (OFDM). The resource elements (REs) that do not multiplex the DM-RSs in an OFDM symbol are set as Null.

One or more embodiments of the invention relate to a user equipment (UE) that includes a transmitter that transmits, to a base station (BS), Demodulation Reference Signals (DM-RSs) using Discrete Fourier Transform (DFT)-spread (s)-Orthogonal Frequency-Division Multiplexing (OFDM). Predetermined channels are mapped to the resource elements (REs) that do not multiplex the DM-RSs in an OFDM symbol.

Other embodiments and advantages of the present invention will be recognized from the description and figures.

BRIEF DESCRIPTION OF THE DRAWINGS

FIGS. 1A and 1B are diagrams showing DM-RS configurations of a DM-RS configuration type 1 and a DM-RS configuration type 2, respectively.

DETAILED DESCRIPTION

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
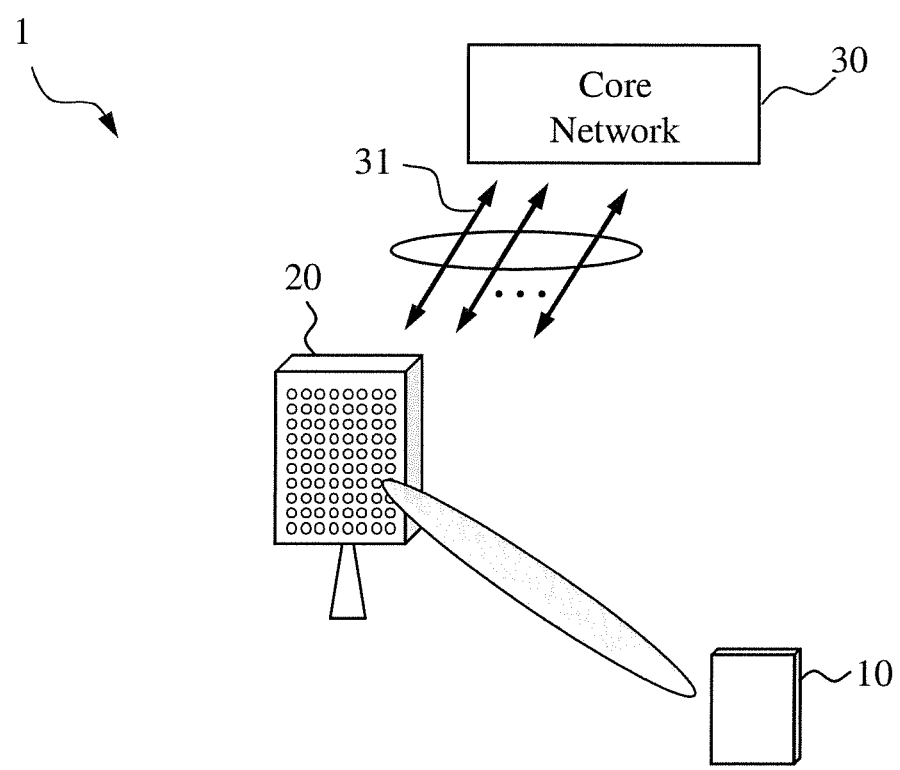
FIG. 2 is a diagram showing a configuration of a wireless communication system according to one or more embodiments of the invention.

FIG. 2 is a diagram showing a wireless communications system 1 according to one or more embodiments of the invention. The wireless communication system 1 includes a user equipment (UE) 10, a base station (BS) 20, and a core network 30. The wireless communication system 1 may be an NR system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB).

The BS 20 includes antennas, a communication interface to communicate with an adjacent BS 20 (for example, X2 interface), a communication interface to communicate with the core network 30 (for example, S1 interface), and a Central Processing Unit (CPU) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. For example, the UE 10 may generate a UL DM-RS and transmit the UL DM-RS to the BS 20. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a Random Access Memory (RAM), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

UL DM-RS configurations according to one or more embodiments of the invention will be described below.

In the wireless communication system, the DM-RS may be designed for uplink Discrete Fourier Transform (DFT)-spread (s)-OFDM to ensure coverage in addition to Cyclic Prefix (CP)-OFDM. Applying the DFT-s-OFDM waveform can avoid increasing Peak-to-Average Power Ratio (PAPR) of waveform. The DFT-s-OFDM is supported only for rank 1 transmission in NR.

In a configuration of the UL DM-RS using the DFT-s-OFDM waveform according to one or more embodiments of the present invention, Null is allocated to REs (subcarriers) that do not multiplex the DM-RSs per OFDM symbol. For example, the UE 10 does not multiplex Physical Uplink Shared Channel (PUSCH) on the REs that do not multiplex the DM-RSs. According to such configuration of the DM-RS, single carrier property can be maintained.

Figure 3A:
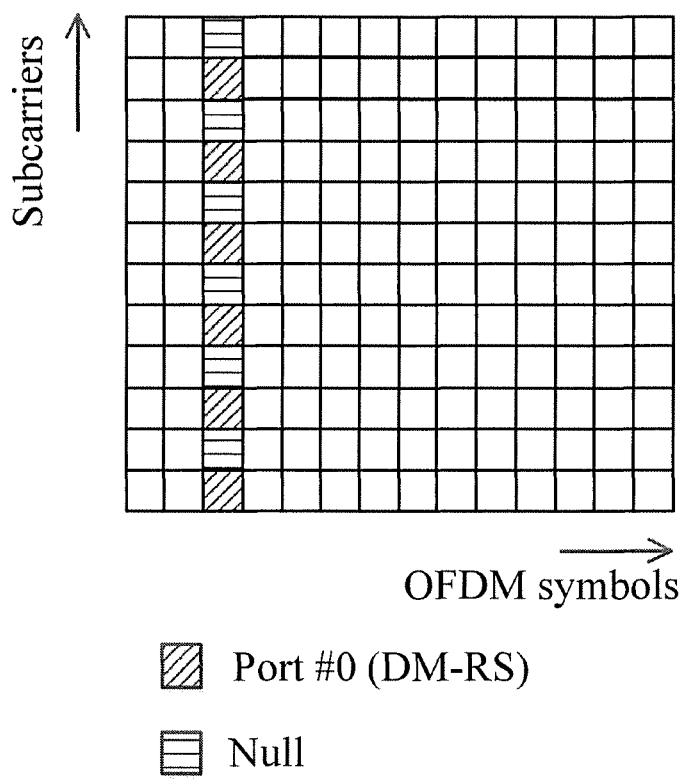
FIGS. 3A and 3B are diagrams showing DM-RS configurations using the DFT-s-OFDM waveform of a DM-RS configuration type 1 and a DM-RS configuration type 2, respectively, according to one or more embodiments of the present invention.
Figure 3B:
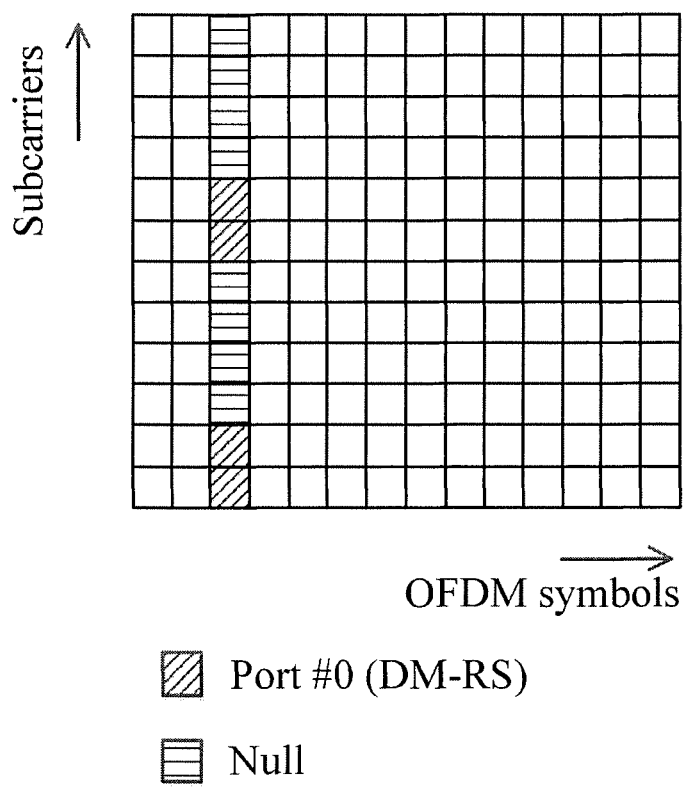

FIGS. 3A and 3B are diagrams showing DM-RS configurations using the DFT-s-OFDM waveform of a DM-RS configuration type 1 and a DM-RS configuration type 2, respectively, according to one or more embodiments of the present invention. In FIGS. 3A and 3B, a horizontal axis represents an OFDM symbol axis (time axis) and a vertical axis represents a subcarrier axis (frequency axis).

As shown in FIG. 3A, in the DM-RS configuration type 1, port #0 for DM-RS is mapped to REs with alternate REs in the subcarrier axis per OFDM symbol. In the same OFDM symbol as the DM-RS, REs on which the DM-RSs are not multiplexed are mapped to Null.

As shown in FIG. 3B, in the DM-RS configuration type 2, a pair of REs are used to map ports #0 for DM-RS. In the same OFDM symbol as the DM-RS, REs on which the DM-RSs are not multiplexed are mapped to Null.

As above, the UL DM-RS according to one or more embodiments of the present invention may be transmitted using the DFT-s-OFDM waveform that supports the rank 1 transmission. In one or more embodiments of the present invention, transmission power for transmission of the DM-RS using the DFT-s-OFDM waveform in the OFDM symbol including Null may be changed from transmission power for transmission of a normal DM-RS such as a DM-RS using the CP-OFDM waveform or DM-RS using multiple ports (multi-rank transmission). The transmission power to be changed may be represented as power density such as Energy Per Resource Element (EPRE).

Figure 4:
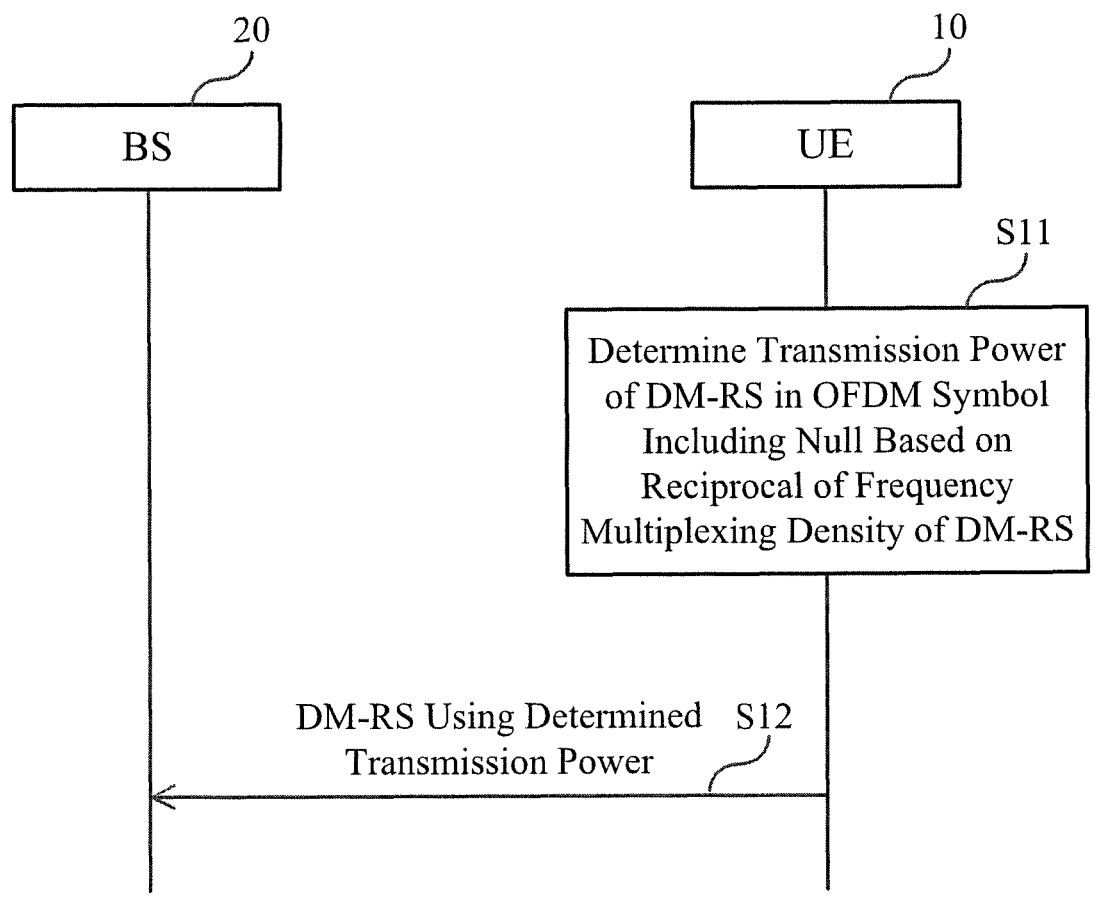
FIG. 4 is a sequence diagram showing a control method of transmission power of a DM-RS according to one or more embodiments of the invention.

For example, the transmission power for the DM-RS transmission using the DFT-s-OFDM waveform may be associated with frequency multiplexing density of the DM-RS. For example, as shown in FIG. 4, at step S11, the UE 10 determines the transmission power for the DM-RS transmission using the DFT-s-OFDM waveform based on a reciprocal of the frequency multiplexing density of the DM-RS. Then, at step S12, the UE 10 transmits the DM-RS using the determined transmission power to the BS 20.

Figure 5:
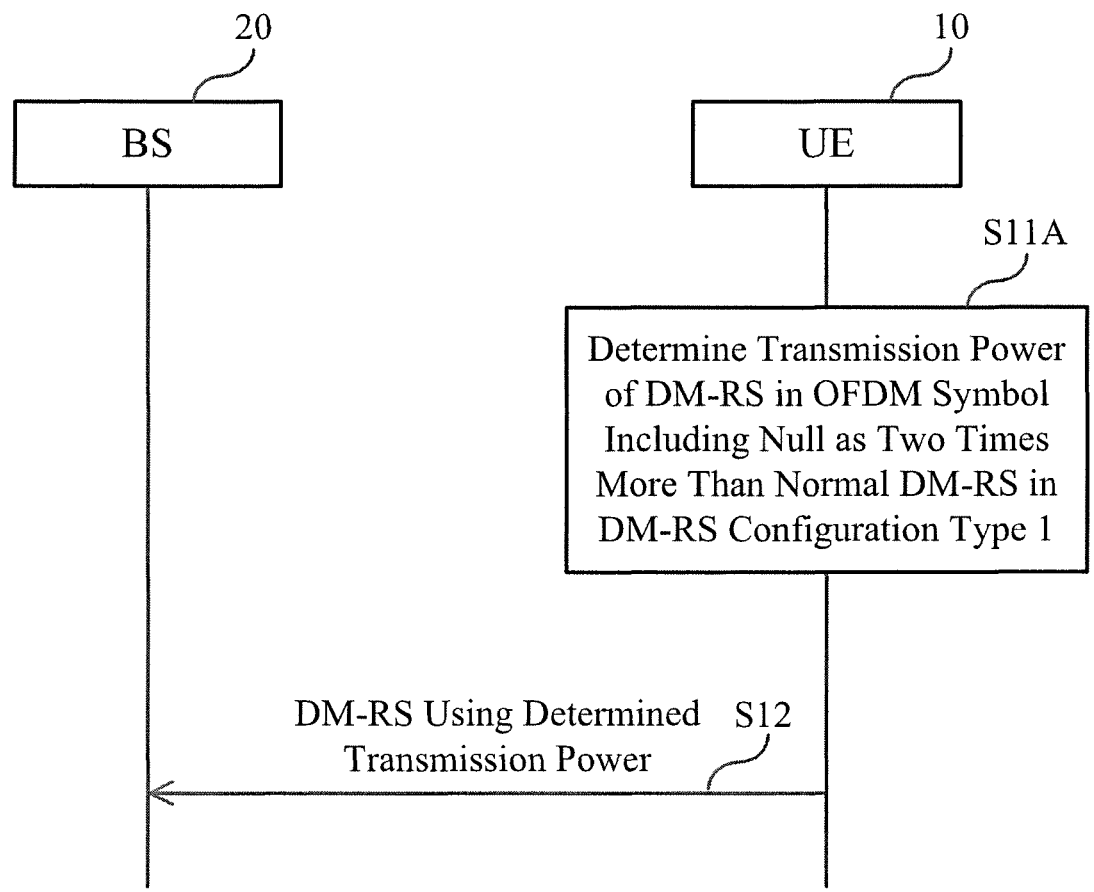
FIG. 5 is a sequence diagram showing a control method of transmission power of a DM-RS according to one or more embodiments of the invention.

For example, as shown in FIG. 5, at step S11A, in the DM-RS configuration type 1, the UE 10 determines the transmission power for the DM-RS transmission using the DFT-s-OFDM waveform as two times more than the normal DM-RS. In such a case, α is 2 in the following formula indicating vectors of DM-RSs to be precoded:

$$\begin{bmatrix} \tilde{r}_{PUSCH}^{(0)} \\ \vdots \\ \tilde{r}_{PUSCH}^{(P-1)} \end{bmatrix} = \alpha \cdot W \begin{bmatrix} r_{PUSCH}^{(0)} \\ \vdots \\ r_{PUSCH}^{(v-1)} \end{bmatrix}$$

where P and W are the number of antenna ports used for Physical Uplink Shared Channel (PUSCH) transmission and precoding matrix for PUSCH, respectively. For PUSCH transmission using a single antenna port, P=1 and v=1.

Figure 6:
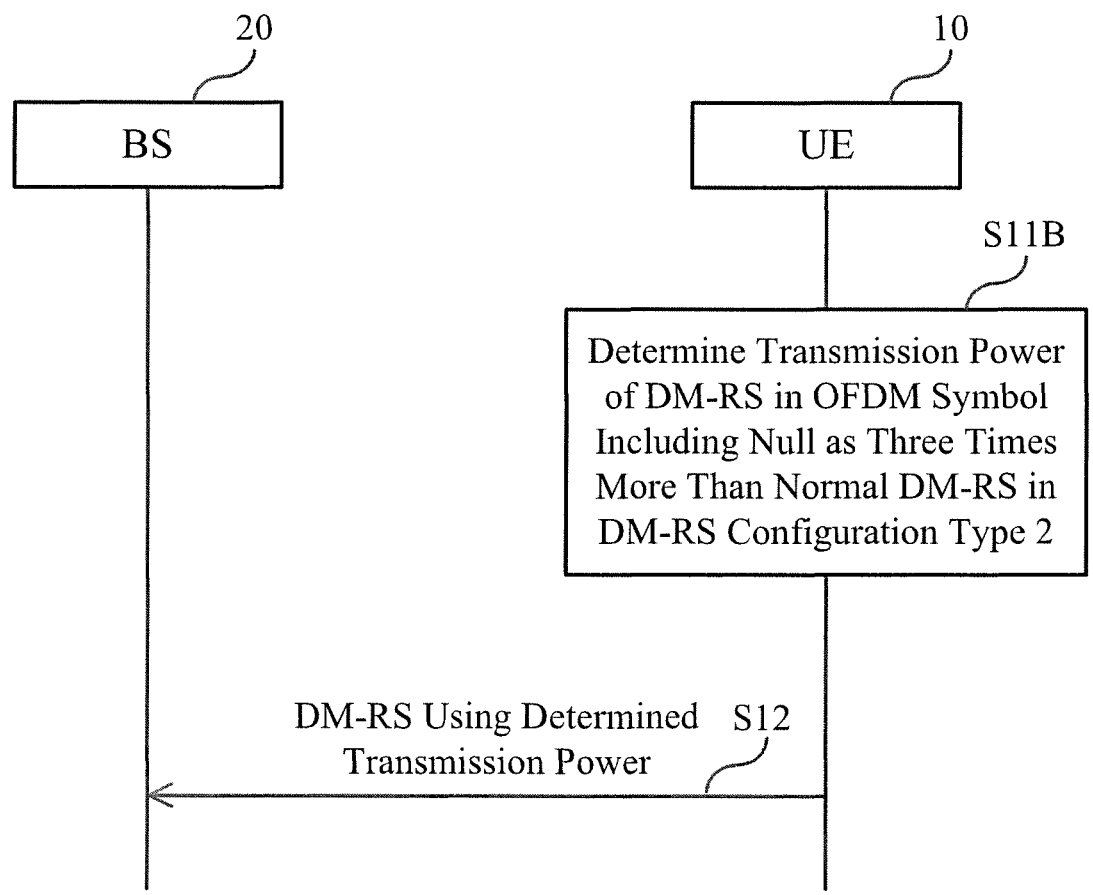
FIG. 6 is a sequence diagram showing a control method of transmission power of a DM-RS according to one or more embodiments of the invention.

For example, as shown in FIG. 6, at step S11B, in the DM-RS configuration type 2, the transmission power for the DM-RS transmission using the DFT-s-OFDM waveform may be three times more than the normal DM-RS. In such a case, α is 3 in the above formula.

Figure 7:
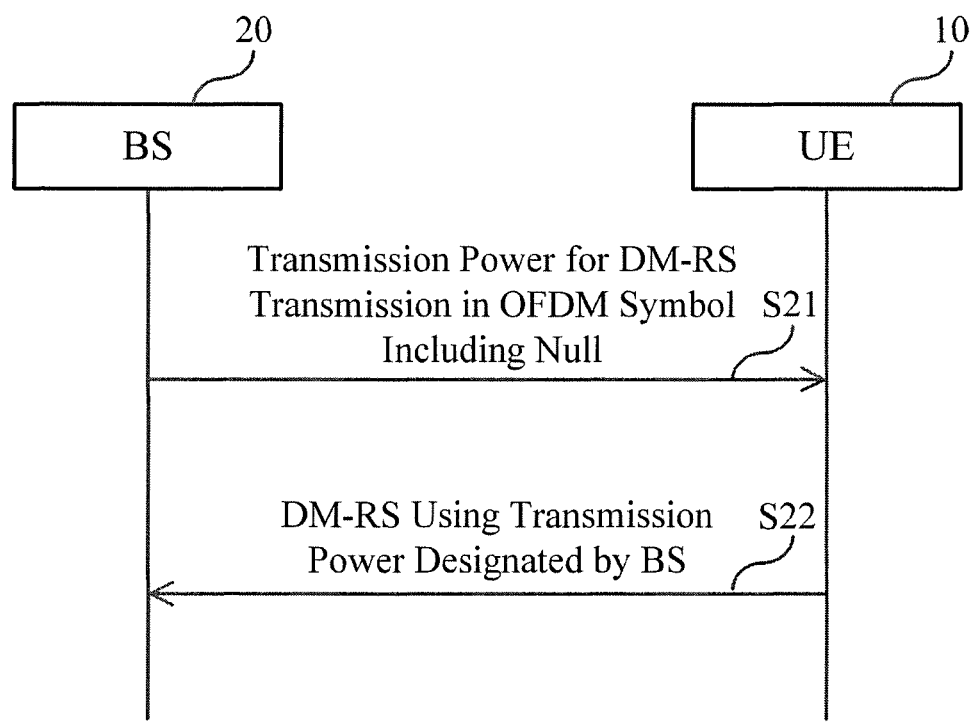
FIG. 7 is a sequence diagram showing a control method of transmission power of a DM-RS according to one or more embodiments of the invention.

For example, as shown in FIG. 7, at step S21, the BS 20 transmits, to the UE 10, information that designates the transmission power for the DM-RS transmission using the DFT-s-OFDM waveform. For example, the designated transmission power may be defined as a relative value to transmission power for PUSCH transmission. At step S22, the UE 10 transmits, to the BS 20, the DM-RS using the transmission power designated by the BS 20.

Figure 8A:
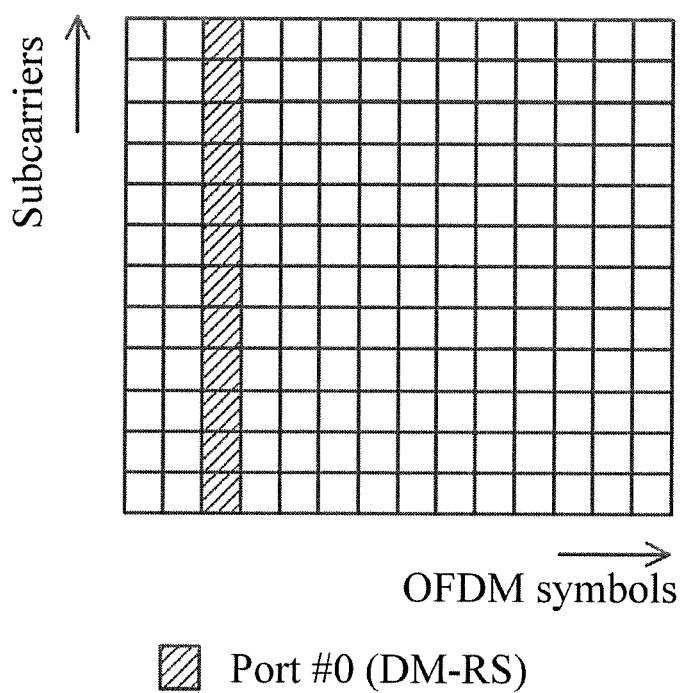
FIGS. 8A and 8B are diagrams showing DM-RS configurations using the DFT-s-OFDM waveform of a DM-RS configuration type 1 and a DM-RS configuration type 2, respectively, according to one or more embodiments of the present invention.
Figure 8B:
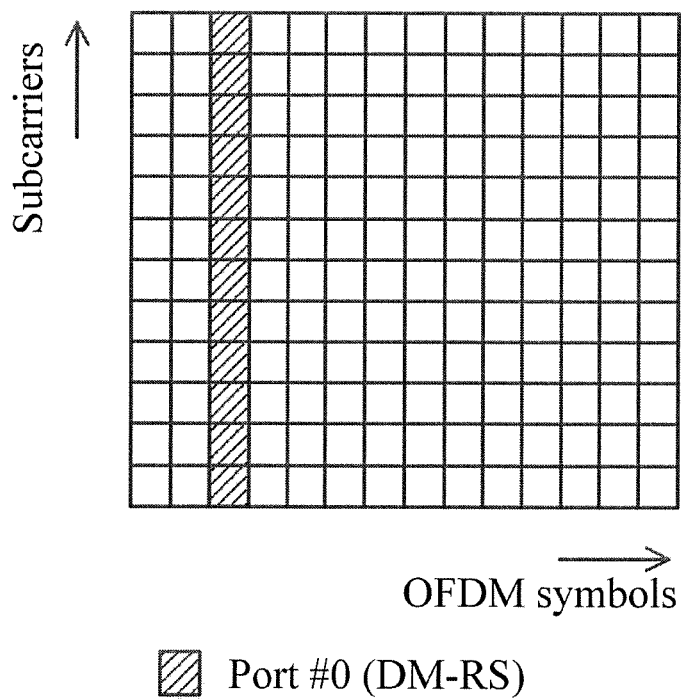

According to one or more embodiments of another example of the present invention, in a configuration of the UL DM-RS using the DFT-s-OFDM waveform, the DM-RSs are mapped to all subcarriers per OFDM symbol. FIGS. 8A and 8B are diagrams showing DM-RS configurations using the DFT-s-OFDM waveform of a DM-RS configuration type 1 and a DM-RS configuration type 2, respectively, according to one or more embodiments of another example of the present invention.

According to one or more embodiments of the present invention, the DM-RS configuration patterns of FIGS. 3A, 3B, 8A, and 8B may be switched dynamically or semi-statically. For example, the BS 20 may transmit instruction information that instructs to switch the DM-RS configuration patterns to the UE 10. Then, the UE 10 may switch the DM-RS configuration patterns and generate the DM-RS using the switched DM-RS configuration pattern. Furthermore, the transmission power for the DM-RS transmission using the DFT-s-OFDM waveform may be determined based on methods of FIGS. 4-7.

Figure 9A:
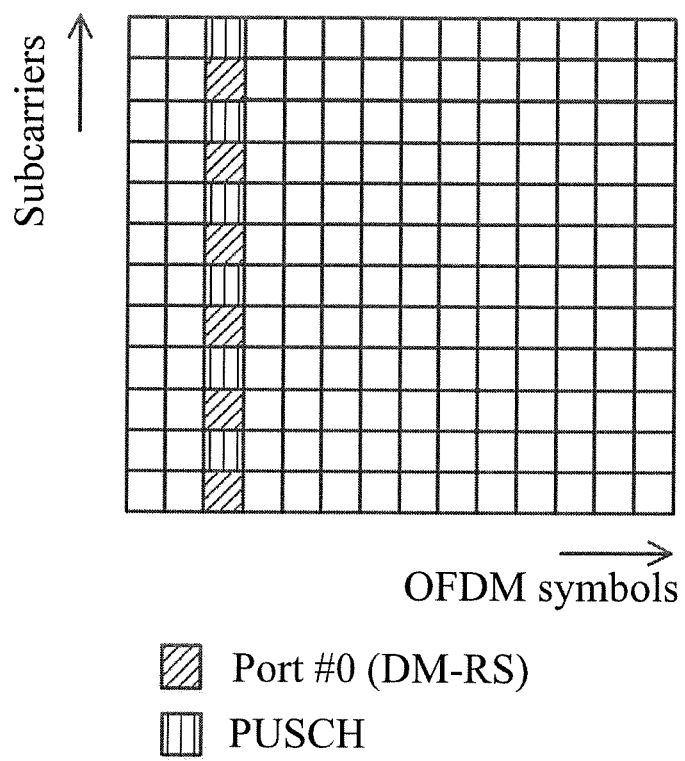
FIGS. 9A and 9B are diagrams showing DM-RS configurations using the DFT-s-OFDM waveform of a DM-RS configuration type 1 and a DM-RS configuration type 2, respectively, according to one or more embodiments of the present invention.
Figure 9B:
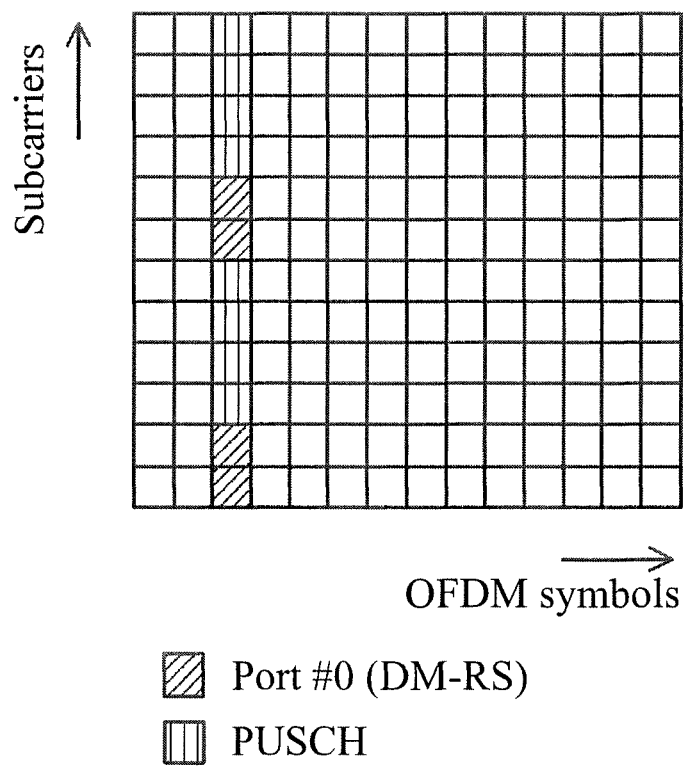

According to one or more embodiments of another example of the present invention, predetermined physical channels or predetermined signals (e.g., PUSCH) may be frequency-multiplexed on the DM-RS using the DFT-s-OFDM waveform. FIGS. 9A and 9B are diagrams showing DM-RS configurations using the DFT-s-OFDM waveform of a DM-RS configuration type 1 and a DM-RS configuration type 2, respectively, according to one or more embodiments of another example of the present invention.

As shown in FIG. 9A, in the DM-RS configuration type 1, port #0 for DM-RS transmission is mapped to REs with alternate REs in the subcarrier axis per OFDM symbol. In the same OFDM symbol as the DM-RS, REs on which the DM-RSs are not multiplexed are mapped to the PUSCHs.

As shown in FIG. 9B, in the DM-RS configuration type 2, a pair of REs are used to map ports #0 for DM-RS. In the same OFDM symbol as the DM-RS, REs on which the DM-RSs are not multiplexed are mapped to PUSCHs.

For example, the BS 20 may notify the UE 10 of whether the predetermined physical channels or the predetermined signals should be frequency-multiplexed on the DM-RS.

For example, the transmission power for the DM-RS transmission may be switched in accordance with whether the predetermined physical channels or the predetermined signals are frequency-multiplexed on the DM-RS.

For example, the BS 20 may notify the UE 10 of the transmission power for the DM-RS in accordance with whether the predetermined physical channels or the predetermined signals are frequency-multiplexed on the DM-RS.

(Configuration of BS)

Figure 10:
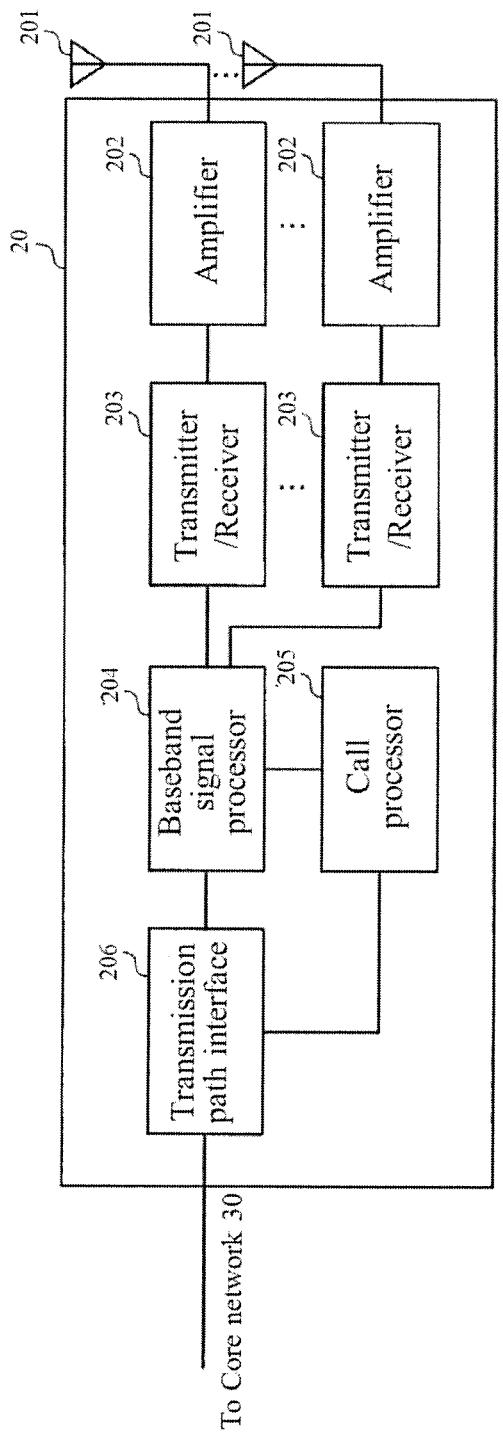
FIG. 10 is a diagram showing a schematic configuration of a BS according to one or more embodiments of the invention.

The BS 20 according to one or more embodiments of the invention will be described below with reference to FIG. 10. FIG. 10 shows a schematic configuration of the BS 20 according to one or more embodiments of the invention. The BS 20 may include a plurality of antennas (antenna element group) 201, amplifier 202, transceiver (transmitter/receiver) 203, a baseband signal processor 204, a call processor 205, and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antenna 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

(Configuration of User Equipment)

Figure 11:
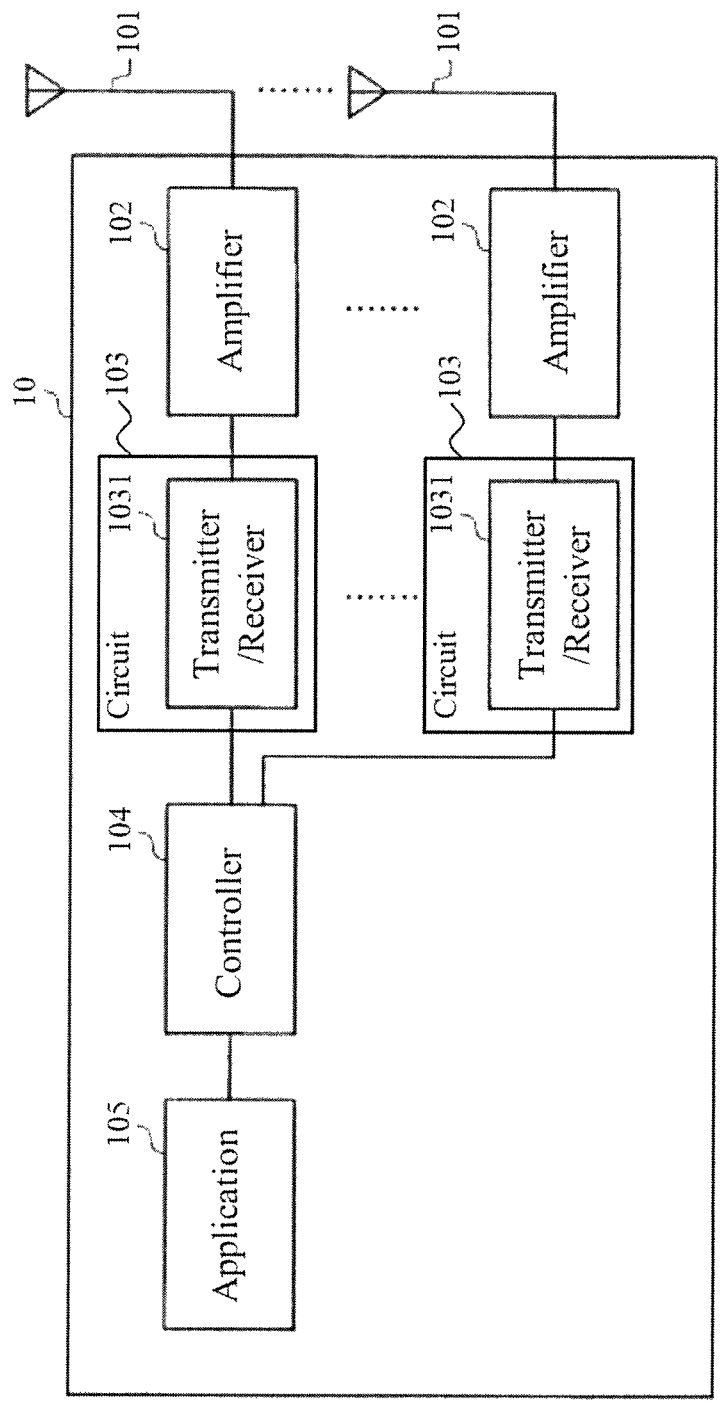
FIG. 11 is a diagram showing a schematic configuration of a UE according to one or more embodiments of the invention.

The UE 10 according to one or more embodiments of the invention will be described below with reference to FIG. 11. FIG. 11 shows a schematic configuration of the UE 10 according to one or more embodiments of the invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the present invention may be used for the FL DM-RS and the additional DM-RS.

One of more embodiments of the present invention may be used for DM-RS for CP-OFDM uplink and downlink. If it is applied for the downlink, the technologies for the signaling can be also used to UE assumption for DM-RS measurement.

One or more embodiments of the present invention may be used for each of the uplink and the downlink independently. One or more embodiments of the present invention may be also used for both of the uplink and the downlink in common. The uplink channel and signal may be replaced with the downlink signal channel and signal.

Although the present disclosure mainly described examples of a channel and signaling scheme based on NR, the present invention is not limited thereto. One or more embodiments of the present invention may apply to another channel and signaling scheme having the same functions as NR such as LTE/LTE-A and a newly defined channel and signaling scheme.

Although the present disclosure mainly described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as Downlink Control Information (DCI) and MAC Control Element (CE). Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) comprising:
   a receiver that receives a downlink control information (DCI);
   a processor that determines, based on information contained in the DCI, transmission power of a Demodulation Reference Signal (DM-RS) for Physical Uplink Shared Channel (PUSCH) using a Discrete Fourier Transform-spread-Orthogonal Frequency-Division Multiplexing (DFT-s-OFDM) or a Cyclic Prefix (CP)-OFDM; and
   a transmitter that transmits the DM-RS using the determined transmission power,
   wherein the processor controls the determination of the transmission power so that the transmission power differs between a case of using the DFT-s-OFDM and a case of using the CP-OFDM, and
   wherein the processor determines, based on information notified by higher layer signaling, whether a configuration type of the DM-RS is configuration type 1 or configuration type 2.

2. The UE according to claim 1, wherein the processor controls the transmission power when the configuration type of the DM-RS is configuration type 1 and the DFT-s-OFDM is used, so that the transmission power is two times than a transmit power of the DM-RS using the CP-OFDM.

3. The UE according to claim 1, wherein the DCI contains information related to frequency multiplexing.

4. A radio communication method for user equipment, the method comprising the steps of:
   receiving a downlink control information (DCI);
   determining, based on information notified by higher layer signaling, whether a configuration type of the DM-RS is configuration type 1 or configuration type 2;
   determining, based on information contained in the Downlink Control Information (DCI), transmission power of a Demodulation Reference Signal (DM-RS) for Physical Uplink Shared Channel (PUSCH) using a Discrete Fourier Transform-spread-Orthogonal Frequency-Division Multiplexing (DFT-s-OFDM) or a Cyclic Prefix (CP)-OFDM; and
   transmitting the DM-RS using the determined transmission power,
   wherein, in the determining, the determination of the transmission power is controlled so that the transmission power differs between a case of using the DFT-s-OFDM and a case of using the CP-OFDM.

5. A base station comprising:
   a transmitter that transmits a Downlink Control Information (DCI) to a user equipment; and
   a receiver that receives a Demodulation Reference Signal (DM-RS) for Physical Uplink Shared Channel (PUSCH) transmitted using a transmission power of the DM-RS determined based on information contained in the DCI, and a Discrete Fourier Transform-spread-Orthogonal Frequency-Division Multiplexing (DFT-s-OFDM) or a Cyclic Prefix (CP)-OFDM, wherein the determination of the transmission power is controlled so that the transmission power differs between a case of using the DFT-s-OFDM and a case of using the CP-OFDM,
   wherein a configuration type of the DM-RS, whether configuration type 1 or configuration type 2, is determined based on information in higher layer signaling.

6. A system comprising a base station and a user equipment (UE), wherein:
   the base station comprises:
     a base station transmitter that transmits a Downlink Control Information (DCI) to a user equipment; and
     a base station receiver that receives a Demodulation Reference Signal (DM-RS) for Physical Uplink Shared Channel (PUSCH), and
   the UE comprises:
     a UE receiver that receives the DCI;
     a UE processor that determines, based on information contained in the DCI, transmission power of the DM-RS using a Discrete Fourier Transform-spread-Orthogonal Frequency-Division Multiplexing (DFT-s-OFDM) or a Cyclic Prefix (CP)-OFDM; and
     a UE transmitter that transmits the DM-RS using the determined transmission power,
     wherein the UE processor controls the determination of the transmission power so that the transmission power differs between a case of using the DFT-s-OFDM and a case of using the CP-OFDM,
     wherein the UE processor determines, based on information notified by higher layer signaling, whether a configuration type of the DM-RS is configuration type 1 or configuration type 2.

7. The UE according to claim 2, wherein the DCI contains information related to frequency multiplexing.

8. The UE according to claim 1, wherein the processor sets resource elements (REs), that are not multiplexed with the DM-RS s in an OFDM symbol as Null in a case of using the DFT-s-OFDM.

* * * * *